United States Patent [19]

Deschenes

[11] Patent Number: 4,564,745

[45] Date of Patent: Jan. 14, 1986

[54] PRE-CAST HEATING PANEL

[75] Inventor: Maurice Deschenes, Ste.Thérèse d'en Haut, Canada

[73] Assignee: Geant Entrepeneur Electrique Ltee, Laval, Canada

[21] Appl. No.: 583,213

[22] Filed: Feb. 24, 1984

[51] Int. Cl.$^4$ .............................................. H05B 3/28
[52] U.S. Cl. ..................... 219/213; 219/457; 219/345; 219/544; 219/464
[58] Field of Search ............... 219/213, 457, 464, 465, 219/468, 345, 544, 548, 549

[56] References Cited

U.S. PATENT DOCUMENTS

| 1,684,157 | 9/1928 | Sterling | 219/544 |
| 2,504,146 | 4/1950 | Mossin | 219/548 |
| 2,540,295 | 2/1951 | Schreiber | 219/213 |
| 2,866,066 | 12/1958 | Neely | 219/544 |
| 2,912,555 | 11/1959 | Jamison | 219/213 |
| 3,069,522 | 12/1962 | Jamison | 219/213 |
| 3,157,097 | 11/1964 | Stinnett | 219/213 |
| 3,265,858 | 8/1966 | MacGuire | 219/213 |
| 3,573,427 | 4/1971 | Minsk | 219/213 |
| 3,626,149 | 12/1971 | Carney | 219/213 |
| 3,646,322 | 1/1971 | Speekman | 219/548 |
| 4,058,982 | 11/1977 | Wright | 219/548 |

FOREIGN PATENT DOCUMENTS

| 1018755 | 10/1977 | Canada | 219/213 |
| 0004188 | 9/1979 | European Pat. Off. | 219/213 |

OTHER PUBLICATIONS

'Sno-Melter" brochure, Singer Climate Control Division, A:I.A. No. 30-A-2, 3/5/68.

Primary Examiner—Clifford C. Shaw
Assistant Examiner—Teresa J. Walberg
Attorney, Agent, or Firm—Schwartz, Jeffery, Schwaab, Mack, Blumenthal & Evans

[57] ABSTRACT

A heating panel includes a fiber-reinforced mortar prepared from a mixture of a cementing material, a finely divided mineral aggregate and water and incorporating a fibrous reinforcement material homogeneously dispersed therein, and a flexible electric heating element embedded in the fiber-reinforced mortar. The heating panel of the invention can be made relatively thin while still exhibiting good flexural, compressive and tensile strength properties, thus being relatively light in weight for ease of handling and low cost transportation.

12 Claims, 4 Drawing Figures

U.S. Patent  Jan. 14, 1986  4,564,745
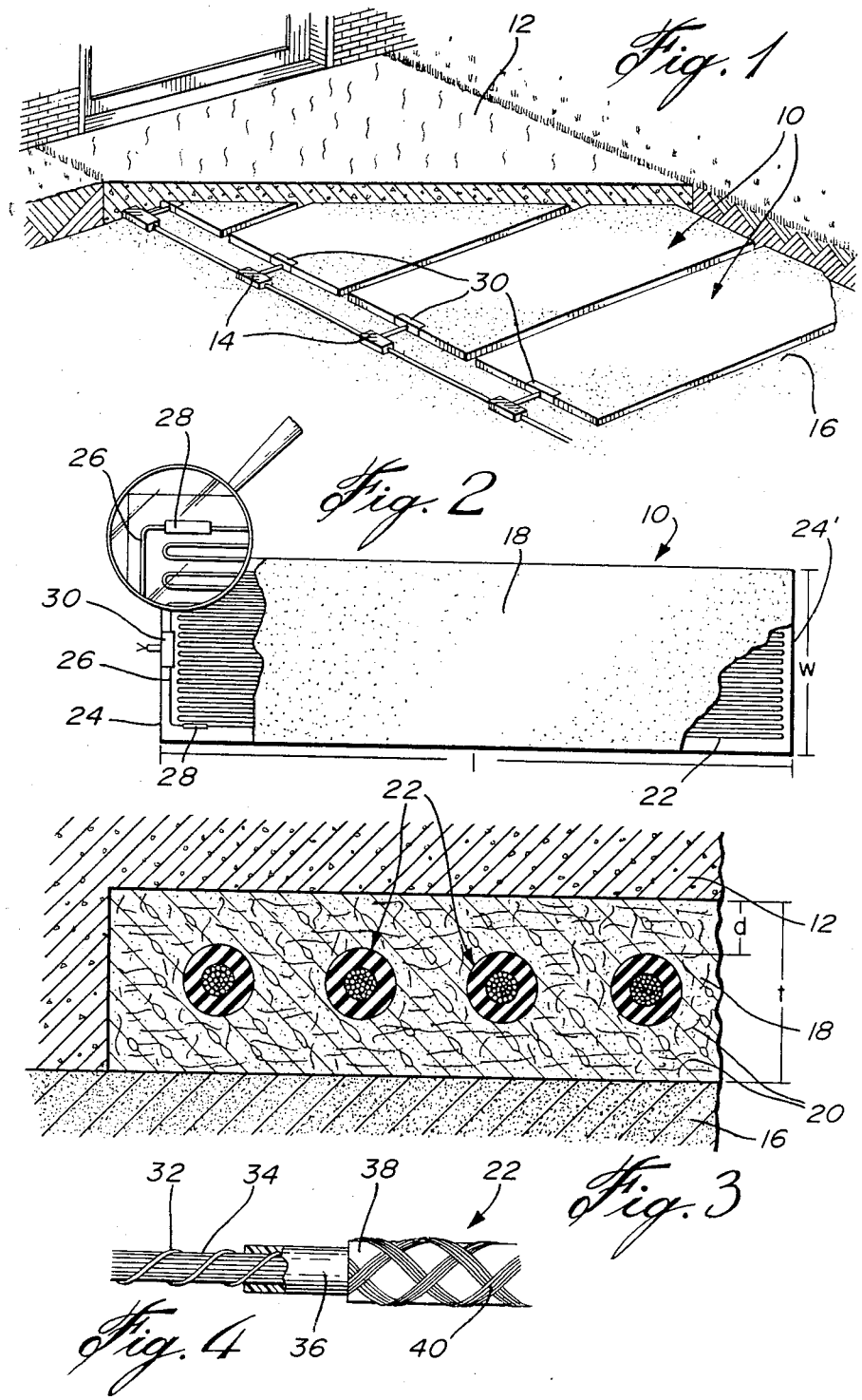

PRE-CAST HEATING PANEL

BACKGROUND OF THE INVENTION

The present invention relates to a pre-cast heating panel as well as to a method of fabricating same. More particularly, the invention is directed to improvements in heating panels of the type comprising a cement-based material with an electric heating element embedded therein.

Electrically heated ground coverings made of concrete having electric heating wires embedded therein have long been known. These heated ground coverings are particularly useful for driveways, sidewalks, roads or other traffic bearing surfaces for the purpose of maintaining such surfaces free of ice and snow accumulation. They are generally formed at the job site by positioning an electric heating wire in a given pattern, usually a sinusoidal configuration, onto a support material such as sand, gravel or a layer of concrete, and then pouring concrete thereover. The electric wire so installed at the job site is subject to mechanical breakage such as by being threaded over, as well as to electrical short-circuit, for instance, when the moving mass of poured concrete brings two adjacent wires into contact with each other, and it is often after the concrete has been poured over the wire that such failures in the wire are noticed. It thus becomes necessary to locate the exact position where there is a failure in the wire, which may be quite time consuming, and then to proceed to the necessary repairs after having broken the concrete in order to gain access to the embedded wire. This of course adds to the cost of installation.

A number of solutions to these problems have been proposed. In U.S. Pat. No. 3,069,522, for example, a heater element for embeddment in a concrete slab is described, which comprises a plurality of plastic tubes connected adjacent their opposite ends with spacer strips in a manner such that the tubes are held in equidistantly spaced parallel relation with the free ends of the tubes extending beyond the spacer strips. An electrical heater wire is threaded into one outermost tube and then threaded back and forth through the several tubes in a reverse manner to extend outwardly from the opposite outermost tube, thereby forming a plurality of equidistantly spaced flights that are supported and anchored against movement with respect to each other. Such a heater element which is thus prefabricated into a relatively rigid grill may be embodied within the concrete at the point of use or it may be laid directly upon the exposed surface of a prebuilt concrete walk or the like and then covered and bonded to the concrete surface by the application of epoxy resin.

In U.S. Pat. No. 3,573,427, on the other hand, the accumulation of ice and snow on an asphaltic concrete pavement is prevented by the use of an asphaltic concrete made electrically conductive by the addition of graphite particles thereto and by the passage of an electrical current through such asphaltic concrete to generate sufficient heat to melt the ice or snow. The heated ground covering proposed in U.S. Pat. No. 3,626,149 also utilizes a graphited concrete but for improving the thermal conductivity of the concrete, since the use of conventional heating means such as an electrical resistance element embedded in the concrete is retained.

Prefabricated ice and snow melting panels have also been described, for example, in U.S. Pat. No. 2,912,555. In this patent, a relatively stiff insulating board is used to immobilize an electric heating wire which is laced into the board through spaced-apart apertures at each end thereof so as to form several flights of wire overlying the upper surface of the board in substantially equidistantly spaced parallel relation. The board and its assembled wire are then embedded into a molded body of plastic material such as concrete to thereby form a heating panel. A plurality of such heating panels can be laid directly on the ground and anchored in interlocked position to constitute heated driveways, walkways or the like.

Hitherto known heating panels made of concrete such as those described above, whether being prefabricated or formed at the job site, are essentially limited in application to ground coverings due to their heavy weight. It would thus be desirable to have a prefabricated cement-based heating panel of reduced weight that could be easily handled and have a wider range of application, e.g., for heating the walls or floors of buildings.

SUMMARY OF THE INVENTION

It is therefore an object of the present invention to provide a prefabricated cement-based heating panel that can be made relatively thin and thus be light in weight for ease of handling and universal application.

In accordance with one aspect of the invention, there is provided a heating panel comprising a fiber-reinforced mortar prepared from a mixture of a cementing material, a finely divided mineral aggregate and water and incorporating a fibrous reinforcement material homogeneously dispersed therein, and a flexible electric heating element embedded in the fiber-reinforced mortar.

The invention also provides, in a further aspect thereof, a method of fabricating a heating panel as defined above. The method of the invention comprises the steps of:

(a) preparing a mortar by mixing together a cementing material, a finely divided mineral aggregate and water to form a smooth lump-free slurry;

(b) admixing a fibrous reinforcement material;

(c) spraying layers of the slurry of mortar admixed with the fibrous reinforcement material into a mold so as to form a multi-layered base of fiber-reinforced mortar and to thereby provide a homogeneous dispersion of the fibrous reinforcement material in the mortar;

(d) positioning a flexible electric heating element over the base;

(e) spraying additional layers of the slurry of mortar admixed with the fibrous reinforcement material over the base and the heating element so as to form a multi-layered covering of fiber-reinforced mortar in which the fibrous reinforcement material is homogeneously dispersed;

(f) allowing the fiber-reinforced mortar of the base and covering to set and bind together with the heating element sandwiched therebetween, thereby obtaining a heating panel; and (g) removing the heating panel thus obtained from the mold.

The use of fiber-reinforced mortar according to the invention enables one to obtain a heating panel which can be made relatively thin while still exhibiting good flexural, compressive and tensile strength properties, thus being relatively light in weight. A typical heating panel fabricated in accordance with the invention has a length of about 10 feet, a width of about 4 feet and a thickness of about 158 of an inch. Such a panel weighs about 7 pounds per square foot and can therefore be easily handled in addition to affording low cost transportation. Generally, the thickness of the heating panels of the invention will vary from about 0.25 inch to about 1 inch.

The cementing material and mineral aggregate preferably used are Portland cement and sand. The mortar is advantageously prepared from a mixture of Portland cement, sand and water having a water to cement ratio of about 0.33–0.35. Thus, compared to ordinary concrete, the mortar mix does not include coarse aggregates such as stones, gravel or the like and is much more dryer since the minimum water to cement ratio for concrete is about 0.45. A lower ratio of water to cement improves the overall physical properties of the mortar.

Conventional additives can also be incorporated into the mortar mix. For example, a water reducing agent such as PDA 25 (trade mark) may be added to increase fluidity and thus provide better workability while keeping the water quantity to a minimum. A plasticizer such as MIGHTY 150 (trade mark) can also be used to impart added workability and flowability and to obtain a homogeneous mix.

Examples of suitable fibrous reinforcement material include asbestos fibers and glass fibers. However, when glass fibers are used, it is important that these be alkali resistant since glass is subject to alkaline attack when incorporated in cement. Preferably, use is made of the alkali resistant glass fibers sold under the trade mark CEM-FIL, which are made of zirconia-containing glass. Such glass fibers are generally used in an amount of about 3% to about 6% by weight, based on the total weight of the mortar mix.

The heating element preferably used is an electric heating cable available under the trade mark DEE-PHEAT from Smith-Gates Corporation. Such a cable which combines excellent stretch properties and flexibility comprises an electric resistance wire spiraled around a flexible glass fiber core, a polyvinyl chloride sheathing surrounding the resistance wire and glass fiber core, a nylon jacket extending over the sheathing and a braided copper ground covering the jacket.

Because of their reduced thickness and weight, the heating panels of the invention can be used not only to melt snow or ice on driveways, walkways or the like but also to heat the rooms of buildings since they can be easily incorporated into the walls and/or floors thereof. In particular, they can be used in arenas where they can be positioned between the ice forming conduit system and the underlying soil or infra-structure for preventing the latter from freezing. The heating panels of the invention can also be incorporated into the soil to serve as radiant heat source in agricultural, horticultural and farming applications.

BRIEF DESCRIPTION OF THE DRAWINGS

Further features and advantages of the invention will become more readily apparent from the following description of a preferred embodiment thereof as illustrated by way of example in the accompanying drawings, wherein:

FIG. 1 is a part-sectional perspective view showing a plurality of heating panels according to the invention installed under an asphaltic pavement;

FIG. 2 is a partly cut away top view of a heating panel as shown in FIG. 1;

FIG. 3 is a fragmentary cross-sectional view of such a heating panel; and

FIG. 4 is a fragmentary part-sectional view of the electric heating cable used in the heating panels.

DESCRIPTION OF PREFERRED EMBODIMENTS

Referring first to FIG. 1, a plurality of pre-cast heating panels 10 of rectangular configuration are seen installed under an asphaltic pavement 12 and electrically connected to a common source of electrical energy by means of junction boxes 14. The heating panels 10 are disposed side-by-side on a bed of sand 16. The panels can of course also be positioned on gravel or a layer of concrete, or laid directly on the soil.

As best shown in FIGS. 2 and 3, each panel 10 is made of fiber-reinforced mortar 18 in which the fibers 20 are homogeneously dispersed. An electric heating cable 22 is embedded in the mortar 18. A continuous length of the cable 22 extends lengthwise of the panel and is bent adjacent the end edges 24 and 24' to spread over substantially the entire area of the panel. The ends of the cable 22 are each connected to a non-heating wire or cold lead 26 through a spliced joint 28, the cold leads 26 extending outwardly of the panel as at 30.

A typical heating panel 10 as that illustrated has a length l of about 10 feet, a width w of about 4 feet and a thickness t of about ⅝ of an inch. Owing to the small distance d between the cable 22 and the upper surface of the panel, which is approximately 3/16 of an inch, the heat generated by the cable 22 is immediately transferred to the overlying asphaltic pavement 12 which thus acts as radiant heat source.

FIG. 4 illustrates more clearly the electric heating cable 22 used in the panels 10. As shown, the cable comprises an electrical resistance wire 32 which is spiraled (for stretch properties) around a flexible glass fiber core 34. Electrical insulation is achieved by means of a polyvinyl chloride sheating 36 which surrounds the resistance wire 32 and the glass fiber core 34 and also provides flexibility. A jacket 38 made of flexible nylon and affording high resistance to moisture and abrasion extends over the sheathing 36. Finally, for positive safety, a braided copper ground 40 covers the jacket 38.

The following non-limiting example further illustrates the invention.

EXAMPLE

A smooth lump-free slurry of mortar was prepared starting from the following ingredients (in weight percent):

| Portland cement | 60% |
| sand | 20% |
| water | 20% |

Use was made of a high shear mixer. The total amount of water was first added and the mixer was started. Two thirds of the cement were slowly added, then the sand and thereafter the remaining quantity of cement. Additives such as MIGHTY 150 and PDA 25 were also added in quantities to obtain the desired slump.

The slurry of mortar thus obtained was pumped to a so-called "concentric", hand-held spray gun sold under the trade mark PLURALCO PI and incorporating a fiber chopper unit to which a continuous length of alkali resistant glass fiber was simultaneously fed. Such a gun is adapted to spray the slurry and fiber out of a single nozzle. The controls of the gun were set such that the glass fiber was cut into lengths of about 1 inch and incorporated into the slurry in an amount of about 5% by weight. The slurry of mortar admixed with glass fibers was then hand sprayed into a mold having a length of 10 feet, a width of 4 feet and a depth of ⅜ of an inch. A multi-layered base was first formed by spraying two layers using zigzag motion, the second layer being sprayed in a direction transverse to the first and both layers totalizing about 3/16 of an inch in thickness. This ensures a homogeneous dispersion of the glass fibers in the slurry of mortar. An electric heating cable sold under the trade mark DEEPHEAT and having a diameter of about ¼ of an inch was then laid onto the base so as to form several flights of cable covering substantially the entire area of the base in equidistantly spaced parallel relation, with the spacing being approximately 1 inch. Thereafter, additional layers of the slurry of mortar admixed with glass fibers were sprayed into the mold up to the top thereof. The glass fiber reinforced mortar was allowed to set by wet curing at 95–100% relative humidity for about 7 days.

The heating panel thus obtained was removed from the mold and its physical properties were determined as follows:

| | |
|---|---|
| Density | 125 lbs./ft.$^3$ |
| Impact strength | 75 in. lb./in.$^2$ |
| Compressive strength | 8,000 p.s.i. |
| Bending elastic limit | 1,200 p.s.i. |
| Bending strength | 3,500 p.s.i. |
| Young's Modulus | 2 p.s.i. |
| Effective tensile elastic limit | 500 p.s.i. |
| Ultimate tensile strength | 1,200 p.s.i. |
| Interlaminar shear strength | 600 p.s.i. |
| In plane shear strength | 1,200 p.s.i. |

Such a heating panel weighed only about 300 pounds and could thus be easily manipulated. It was installed on a bed of sand, connected to a source of electrical energy and then covered with an asphaltic pavement having a depth of about 4 inches. When the panel was operated at 50 watts/sq.f., it was observed that it took about 1 hour for snow on the asphaltic pavement to start melting.

I claim:

1. A heating panel comprising a fiber-reinforced mortar prepared from a mixture of a cementing material, a finely divided mineral aggregate and water and incorporating a fibrous non-electrically conductive reinforcement material homogeneously dispersed therein, and a flexible electric heating element embedded in said fiber-reinforced mortar.

2. A heating panel as claimed in claim 1, wherein said cementing material comprises Portland cement.

3. A heating panel as claimed in claim 2, wherein said finely divided mineral aggregate comprises sand.

4. A heating panel as claimed in claim 3, wherein said mortar is prepared from a mixture of Portland cement, sand and water having a water to cement ratio of about 0.33–0.35.

5. A heating panel as claimed in claim 1, wherein said fibrous reinforcement material comprises asbestos fibers.

6. A heating panel as claimed in claim 1, wherein said fibrous reinforcement material comprises alkali resistant glass fibers.

7. A heating panel as claimed in claim 6, wherein said alkali resistant glass fibers are made of zirconia-containing glass.

8. A heating panel as claimed in claim 6, wherein said glass fibers are present in an amount of about 3% to about 6% by weight, based on the total weight of said mixture.

9. A heating panel as claimed in claim 4, wherein said fibrous reinforcement material comprises alkali resistant glass fibers and wherein said fiber-reinforced mortar is prepared from a mixture containing about 60% by weight of Portland cement, about 20% by weight of sand and about 20% by weight of water and incorporates about 5% by weight of said glass fibers, based on the total weight of said mixture.

10. A heating panel as claimed in claim 1, wherein said heating element consists of a cable comprising an electrical resistance wire spiraled around a flexible glass fiber core, a polyvinyl chloride sheathing surrounding said resistance wire and glass fiber core, a nylon jacket extending over said sheathing and a braided copper ground covering said jacket.

11. A heating panel as claimed in claim 10, having a rectangular configuration with opposed end edges and wherein a continuous length of said cable extends lengthwise of said panel and is bent adjacent said end edges to spread over substantially the entire area of said panel.

12. A heating panel as claimed in claim 9, having a thickness of about ⅜ of an inch and a weight per square foot of about 7 pounds.

* * * * *